(12) United States Patent
Kwon et al.

(10) Patent No.: US 9,982,830 B2
(45) Date of Patent: May 29, 2018

(54) IN-PIPE INSPECTION ROBOT

(71) Applicant: KOREA INSTITUTE OF INDUSTRIAL TECHNOLOGY, Cheonan-si, Chungcheongnam-do (KR)

(72) Inventors: O-Hung Kwon, Cheonan-si (KR); Sang-Won Lee, Anseong-si (KR); Dae-Hee Won, Ansan-si (KR); Jin Young Kim, Cheonan-si (KR)

(73) Assignee: Korea Institute of Industrial Technology, Cheonan-si, Chungcheongnam-do (KR)

( * ) Notice: Subject to any disclaimer, the term of this patent is extended or adjusted under 35 U.S.C. 154(b) by 631 days.

(21) Appl. No.: 14/429,602

(22) PCT Filed: Oct. 25, 2013

(86) PCT No.: PCT/KR2013/009594
§ 371 (c)(1),
(2) Date: Mar. 19, 2015

(87) PCT Pub. No.: WO2015/030296
PCT Pub. Date: Mar. 5, 2015

(65) Prior Publication Data
US 2015/0233515 A1  Aug. 20, 2015

(30) Foreign Application Priority Data
Aug. 29, 2013 (KR) .................. 10-2013-0103148

(51) Int. Cl.
*B61B 13/00* (2006.01)
*F16L 55/34* (2006.01)
(Continued)

(52) U.S. Cl.
CPC .............. *F16L 55/34* (2013.01); *B25J 5/00* (2013.01); *F16L 2101/30* (2013.01); *Y10S 901/01* (2013.01); *Y10S 901/44* (2013.01)

(58) Field of Classification Search
CPC .......... B61B 13/00; B61B 13/10; B61B 13/12
See application file for complete search history.

(56) References Cited

U.S. PATENT DOCUMENTS

| 4,739,273 A | 4/1988 | Petersen et al. |
| 5,328,180 A | 7/1994 | Benavides et al. |
| 2009/0307891 A1* | 12/2009 | Offer .................. G21C 17/017 29/402.11 |

FOREIGN PATENT DOCUMENTS

| JP | 09-257155 A | 9/1997 |
| KR | 10-0839546 B1 | 6/2008 |
| KR | 10-2009-0131263 A | 12/2009 |

* cited by examiner

*Primary Examiner* — Robert J McCarry, Jr.
(74) *Attorney, Agent, or Firm* — Rabin & Berdo, P.C.

(57) ABSTRACT

Technical objective is to provide an in-pipe inspection robot for inspecting interior of a pipe, which can exert repulsive force to the pipe when the linear actuator is driven. To this purpose, the in-pipe inspection robot, which is moved inside the pipe to inspect the interior of the pipe, includes a linear actuator which is extendably and contractably driven, and a braking unit configured to fix a rear end of the linear actuator to an inner wall of the pipe and release a front end of the linear actuator from a fixed state, when the linear actuator is being extended, and release the rear end of the linear actuator from the fixed state and fix the front end of the linear actuator to the inner wall of the pipe, when the linear actuator is being contracted.

13 Claims, 11 Drawing Sheets

(51) Int. Cl.
*B25J 5/00* (2006.01)
*F16L 101/30* (2006.01)

(a)

(b)

IN-PIPE INSPECTION ROBOT

BACKGROUND OF THE INVENTION

1. Field of the Invention

The present disclosure relates to an in-pipe inspection robot for inspecting a pipe.

2. Description of the Related Art

Generally, an in-pipe inspection robot is provided to inspect the pipelines installed in a nuclear power plant, a thermoelectric power plant or chemical plants where human access is restricted for safety reason, performing a role of improving the safety of the facilities by moving in the pipelines and closely inspecting foreign materials clogging the pipes, cracks occurring in the pipes or micro-defects in the pipes.

The in-pipe inspection robots such as small wheeled electric vehicles are known. However, these robots have problems of unsatisfactory performance of the desired action, for reason such as wheels sliding on pipes. Accordingly, these days, the technology of in-pipe inspection robot employing a linear actuator as a driving means has been developed.

Particularly, a rack-and-pinion system or a ball screw mechanism is known as the linear actuator. The rack-and-pinion system has a structure of using a rotary motor and rack and pinion in which the pinion is rotatably driven by the rotary motor, thus moving the rack forward and backward. The screw device has a structure in which a nut screw-engaged with a screw axis is driven forward and backward by driving of the rotary motor.

Meanwhile, the in-pipe inspection robot is not able to move along the pipes with the rack-and-pinion system and the ball screw device only. Therefore, there is preceding issue that it is necessary to separately develop a brake device which can be adhered to the pipes or released from the adhered state, while exerting repulsive force to the pipes opposite to a direction of advancement.

However, even when the preceding issue is addressed, there still remains an issue of impaired motion on curved portions of the pipe because the rack of the rack-and-pinion system, which is not flexible in lengthwise direction, is stuck at the curved portion of the pipe. Likewise, the ball screw device also has a shortcoming that it is not able to move on the curved portions of the pipes because the screw axis, which is not flexible, is stuck at the curved portions of the pipes.

DETAILED DESCRIPTION OF THE INVENTION

Technical Object

A technical object of the present disclosure is to provide an in-pipe inspection robot which is able to exert repulsive force during driving of a linear actuator.

Another technical object of the present disclosure is to provide an in-pipe inspection robot which is still able to move even on a curved portion of the pipe.

Means to Solve the Object

According to an embodiment of the present invention, an in-pipe inspection robot moving inside a pipe is provided, which may include a linear actuator which is extendably and contractably driven, and a braking unit configured to fix a rear end of the linear actuator to an inner wall of the pipe and release a front end of the linear actuator from a fixed state, when the linear actuator is being extended, and release the rear end of the linear actuator from the fixed state and fix the front end of the linear actuator to the inner wall of the pipe, when the linear actuator is being contracted.

The braking unit may include a first brake part provided on the front end of the linear actuator, and a second brake part provided on the rear end of the linear actuator.

Each of the first and second brake parts may include a braking motor provided on the linear actuator and comprising a motor axis, a rotating member connected to the motor axis and having such a configuration that a diameter is gradually decreased in a lengthwise direction, the rotating member comprising a thread on an outer circumference, and a friction part screw-engaged, at one side, to the rotating member, and movably supported, at the other side, by the linear actuator, wherein during driving of the braking motor, the friction part is moved along a lengthwise direction of the rotating member to be gradually extended or contracted according to a shape of the rotating member.

The friction part may include two or more friction members provided at interval with reference to a center of the rotating member.

The linear actuator may include a housing, the braking motor may be provided in the housing, and the motor axis may be exposed outside the housing to be connected with the rotating member.

The friction part may be provided in the housing so as to be movable in a first direction and a second direction by a movement guide part, wherein the first direction may correspond to the lengthwise direction of the rotating member and the second direction may correspond to a radial direction of the rotating member. The movement guide part may include a horizontal long hole elongated in the housing along the second direction, a perpendicular through hole elongated in the friction part along the first direction, and a guide member movably inserted, with one side, into the horizontal long hole and inserted, with the other side, to the perpendicular through hole.

Each of the first and second brake parts may additionally include a roller part rotatably provided on the housing so as to be smoothly moved along the inner wall of the pipe, when the friction part is separated from the inner wall of the pipe.

The roller part may be provided at a location corresponding to the friction part.

The linear actuator may include a housing part, a driving motor provided in the housing part, a screw guide in a cylindrical shape, the screw guide being rotated by the driving motor and having a thread on an upper half of an outer circumference, a toothed spring wound cylindrically on the screw guide, the toothed spring having a front end being screw-engaged with the thread, and a plurality of teeth on an outer circumference, so as to be exited toward a front direction when the screw guide is rotated, and a plate spring having a plurality of tooth holes to be meshed with the plurality of teeth, so that the plurality of teeth is meshed with the plurality of tooth holes and exited together while the toothed spring is being exited toward a front direction.

The housing part may additionally include a first housing and a second housing, and when the braking unit comprises a first brake part provided on the front end of the linear actuator and a second brake part provided on the rear end of the linear actuator, the first brake part is provided on the first housing and the second brake part is provide don the second housing.

The linear actuator may additionally include a guide arm provided on the housing part, to bring the plate spring to a close contact with the toothed spring while the plurality of teeth is being engaged with the plurality of tooth holes.

The toothed spring may be operated according to forward and reverse direction of the driving motor so that during forward rotation of the driving motor, the toothed spring is exited by the screw guide toward the front direction, thus widening pitch interval thereof, and during reverse rotation of the driving motor, the toothed spring may be entered by the screw guide toward the rear direction and stacked into a cylindrical shape. The plate spring may be operated according to the forward and reverse rotation of the driving motor so that during forward rotation of the driving motor, the plate spring is exited together with the toothed spring which is exiting, as the plurality of tooth holes is meshed with the plurality of teeth of the toothed spring, thus being extended into a cylindrical shape with an increased length, and during reverse rotation of the driving motor, the plate spring may be stacked in a radial direction thereof, thus decreasing in the length thereof.

The plurality of tooth holes may include a plurality of upper tooth holes formed in an upper portion of the plate spring, and a plurality of lower tooth holes formed in a lower portion of the plate spring, and the plurality of lower tooth holes and the plurality of upper tooth holes may be overlapped at each pitch and are meshed with the plurality of teeth.

The screw guide may have a shape of a hollow cylinder, and the driving motor is located inside the screw guide.

Effect of the Invention

As described above, the in-pipe inspection robot according to embodiments of the present disclosure may have the following effects.

According to embodiments of the present disclosure, because the in-pipe inspection robot includes a braking unit, the in-pipe robot is able to exert repulsive force against the pipe during driving of the linear actuator, and thus is able to move smoothly inside the pipe.

Moreover, according to embodiments of the present disclosure, because of a linear actuator whose entire length is extendable and contractable, the in-pipe inspection robot is able to move smoothly on a curved portion of the pipe.

BRIEF DESCRIPTION OF THE DRAWINGS

FIG. 3 is an illustration of FIG. 2 cut along line III-III, in which FIG. 3A shows a friction part in extended arrangement, and FIG. 3B shows the friction part in contracted arrangement.

FIG. 3B is a cross-sectional view of the friction part of FIG. 3A which is moved along the rotating member to the closed position.

FIG. 5 illustrates part of a linear actuator of an in-pipe inspection robot, in which FIG. 5A illustrates a screw guide, FIG. 5B illustrates a toothed spring, and FIG. 5C illustrates the toothed spring and the screw guide meshed with each other.

FIG. 9 illustrates a plurality of lower tooth holes and a plurality of upper tooth holes, overlapped at each pitch and meshed together with a plurality teeth, in which FIG. 9A is a perspective view with cut-away main part, and FIG. 9B is a conceptual diagram.

BEST MODE

As will be explained in detail with reference to the attached drawing, the embodiments of the present disclosure will be elaborated in order to help those skilled in the art to embody the present disclosure easily. However, the present disclosure can be implemented in various different forms and not limited to the embodiments explained herein.

Figure 1:
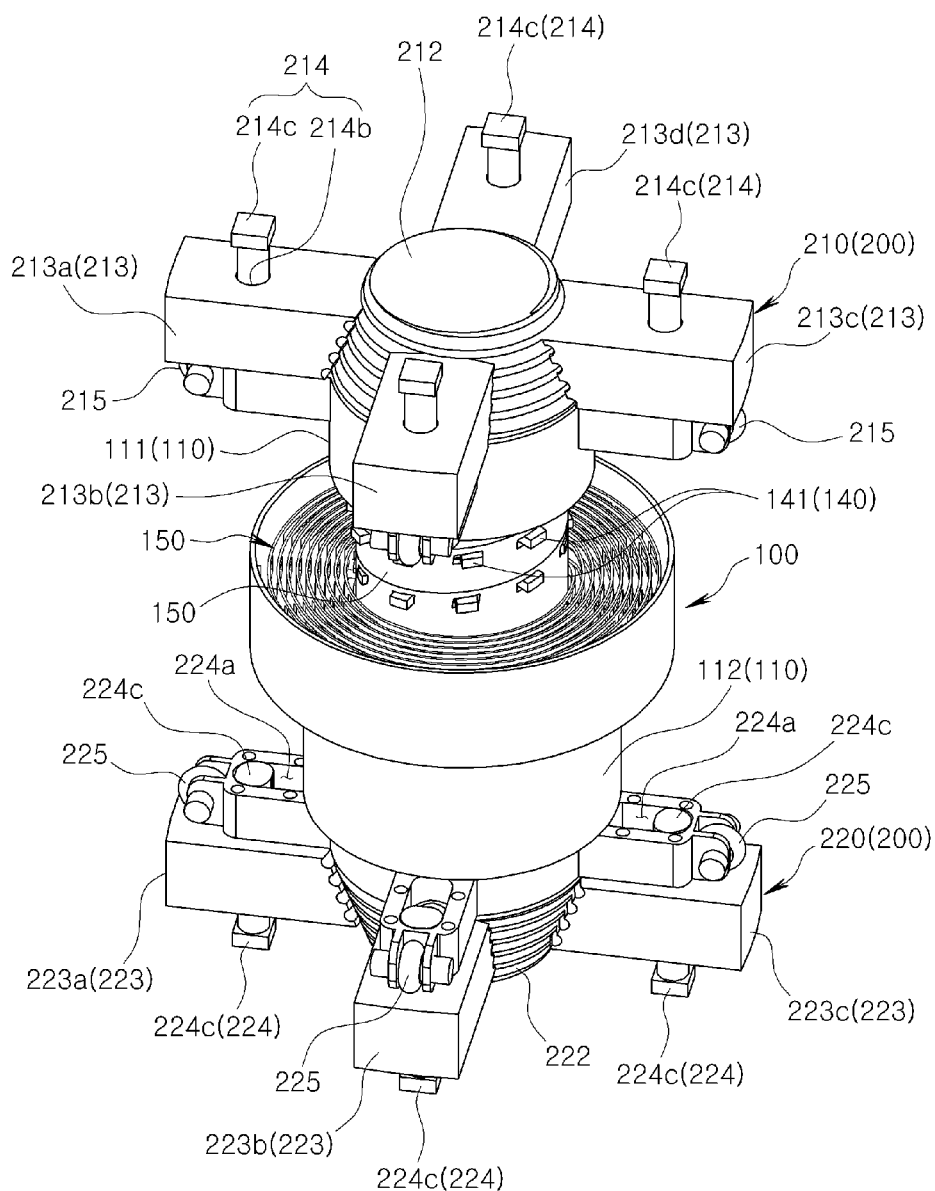
FIG. 1 is a perspective view of an in-pipe inspection robot according to an embodiment of the present disclosure.

FIG. 1 is a perspective view of an in-pipe inspection robot according to an embodiment of the present disclosure.

According to an embodiment, the in-pipe inspection robot R is an in-pipe inspection robot for moving inside a pipe 10, and it includes a linear actuator 100 and a braking unit 200, as shown in FIG. 1.

The linear actuator 100 is driven flexibly, so that during expansion of the linear actuator 100, the braking unit 200 fixes a rear end of the linear actuator 100 to an inner wall of the pipe 10 and releases a front end of the linear actuator 100 from a fixed state, and, during contraction of the linear actuator 100, the braking unit 200 releases the rear end of the linear actuator 100 from the fixed state and fixes the front end of the linear actuator 100 to the inner wall of the pipe 10.

Hereinafter, the braking unit 200 will be explained in detail with reference to FIGS. 1 to 4.

Figure 2:
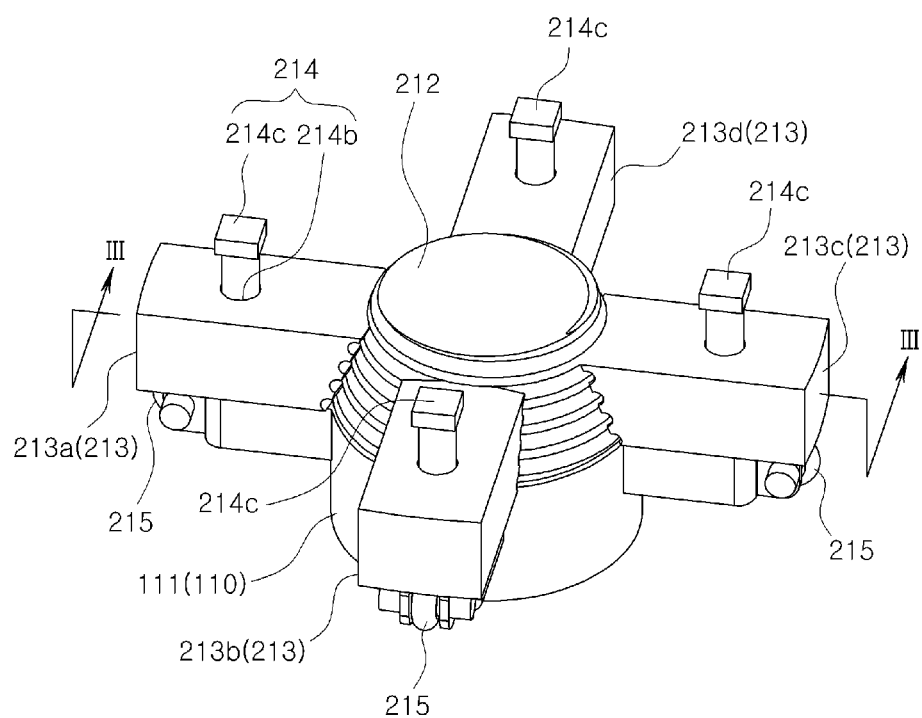
FIG. 2 is a perspective view of a braking unit of the in-pipe inspection robot of FIG. 1.
Figure 3:
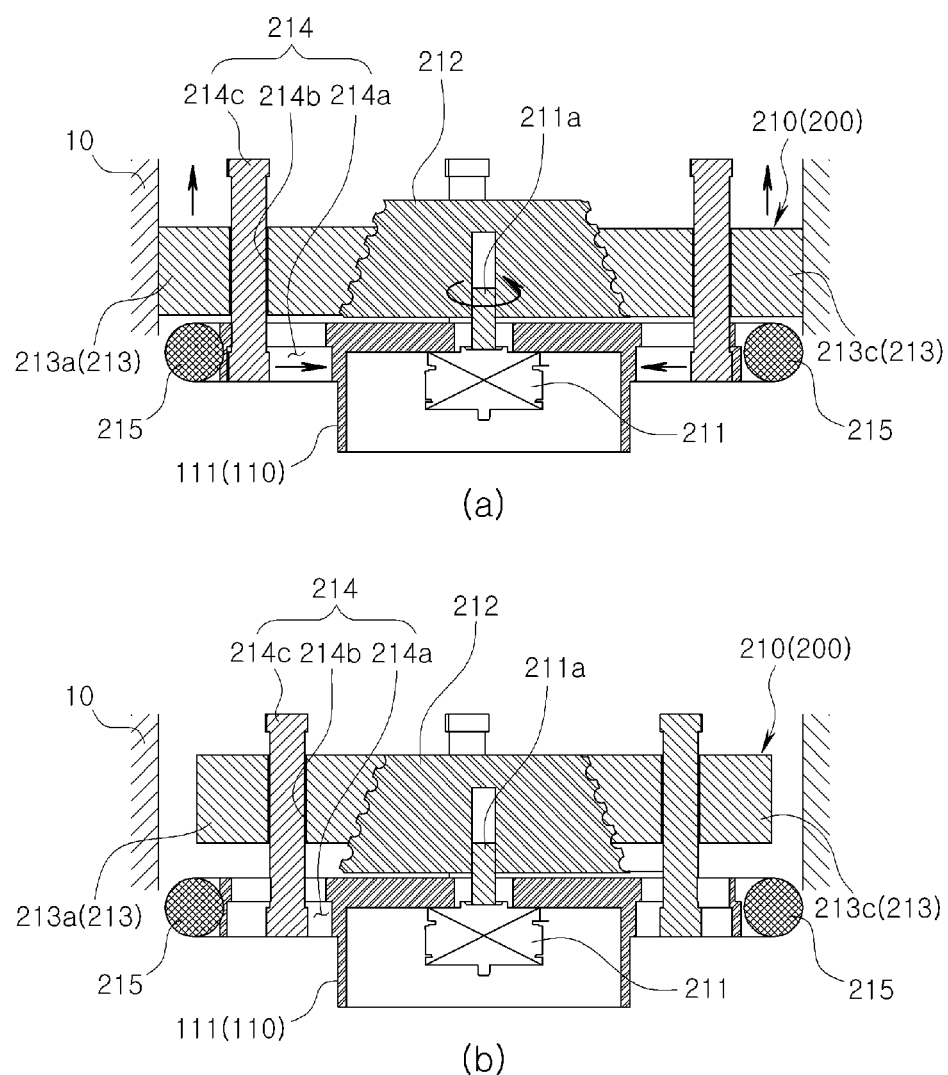
Figure 4:
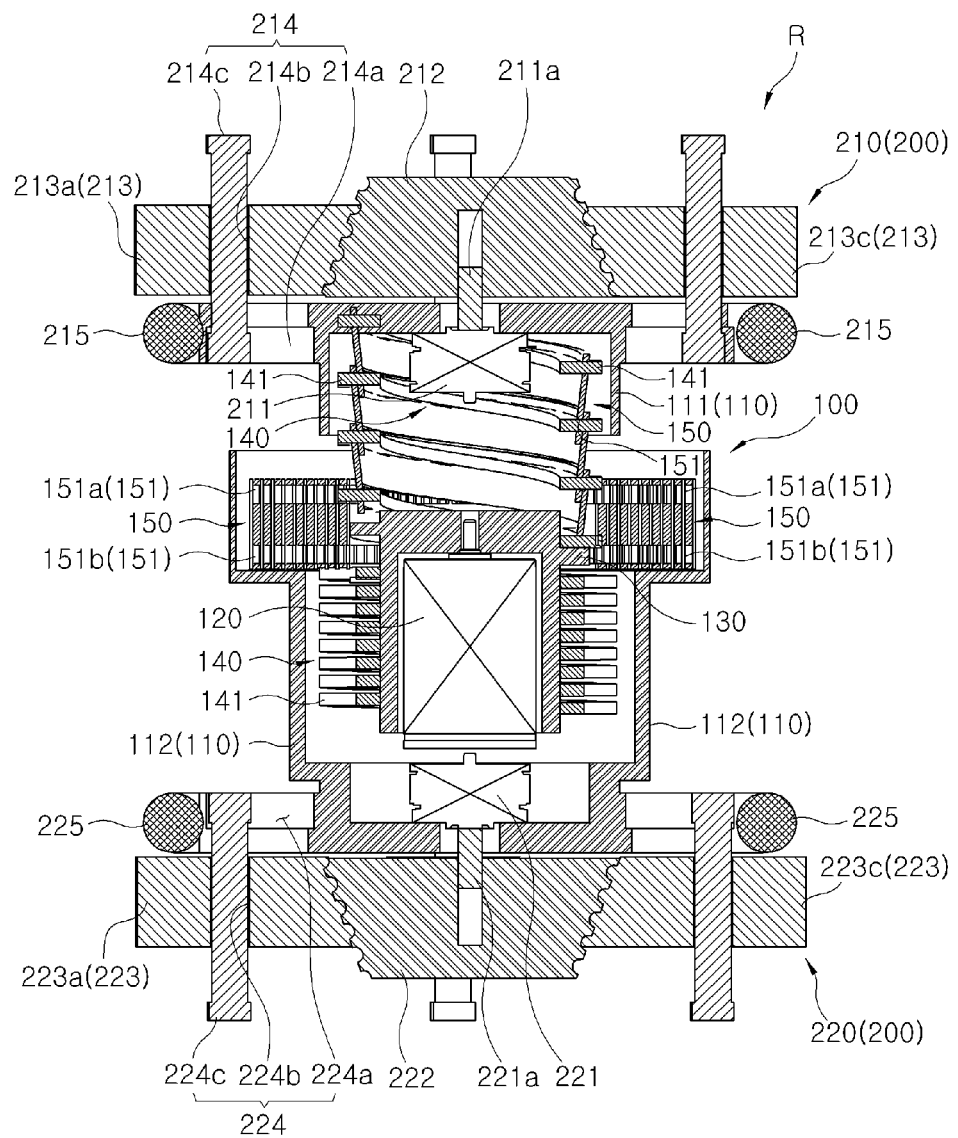
FIG. 4 is a longitudinal cross-sectional view of the in-pipe inspection robot of FIG. 1.

FIG. 2 is a perspective view of a braking unit of the in-pipe inspection robot of FIG. 1, and FIG. 3 is an illustration of FIG. 2 cut along line III-III, in which FIG. 3A shows a friction part in extended state, and FIG. 3B shows the friction part in contracted state. FIG. 4 is a longitudinal cross-sectional view of the in-pipe inspection robot of FIG. 1.

As illustrated in FIGS. 1 and 4, the braking unit 200 may include a first and a second brake parts 210, 220. For example, as illustrated in FIGS. 1 and 4, the first and second brake parts 210, 220 may include the same components as each other, except for the difference in the positions the two are mounted.

First, the first brake part 210 according to an embodiment will be explained. The first brake part 210 may include a first braking motor 211, a first rotating member 212 and a first friction part 213, as illustrated in FIGS. 1 to 4.

Referring to FIGS. 3 and 4, the first braking motor 211 may be provided at the linear actuator 100 and may have a first motor axis 211a. Particularly, in an embodiment where the linear actuator 100 includes the first housing 111, the first braking motor 211 may be fixed in the first housing 111, and the first motor axis 211a may be exposed outside the first housing 111 to be connected with the first rotating member 212.

Referring to FIGS. 1 to 4, the first rotating member 212 may be connected with the first motor axis 211a, and may have such a configuration that the diameter is gradually decreased along a lengthwise direction toward the front direction. The first rotating member 211 may have threads on outer circumference thereof. Particularly, the first rotating member 212 is so configured that the diameter thereof gradually becomes smaller so that while the first friction part 213 (to be described) is being moved toward a front direction or a rear direction along the first rotating member 212, the first friction part 213 is moved to the contracted state (i.e., is moved in) as shown in FIG. 3B, or moved to the extended state (i.e., moved out) as shown in FIG. 3(a). In the extended state, the first friction part 213 is fixed closely to the inner wall of the pipe 10 as shown in FIG. 3A, while in contracted state, the first friction part 213 is separated from the inner wall of the pipe 10 as shown in FIG. 3B.

As another example, although not illustrated, the first rotating member 212 may have such a configuration that the diameter gradually becomes smaller toward the rear direction in the longitudinal direction. Moreover, for convenience of explaining constituent elements to be explained below, the lengthwise direction of the first rotating member 212 may be defined as the "first direction", and the radial direction of the first rotating member 212 may be defined as the "second direction".

One side of the first friction part 213 may be screw-engaged with the first rotating member 212, and the other side may be moveably supported on the linear actuator 100 (e.g., on the first housing 111). Therefore, as explained above, when the first braking motor 211 is driven, the first friction part 213 is moved in a lengthwise direction of the first rotating member 212 to the extended state (see FIG. 3A) or contracted state (see FIG. 3B) according to the shape of first rotating member 212. Particularly, when the first friction part 213 is in extended state, as shown of FIG. 3A, the first friction part 213 is fixed closely to the inner wall of the pipe 10, and, when the first friction part 213 in the contracted state, as shown of FIG. 3B, the first friction part 213 is separated from the inner wall of the pipe, thus releasing the front end of the linear actuator 100 from the fixed state.

Particularly, the first friction part 213 may include two or more friction members provided at intervals with reference to the center of the first rotating member 212. For example, as shown in FIG. 1, the first friction part 213 may include a first friction member 213a, a second friction member 213b, a third friction member 213c, and a fourth friction member 213d, and the greater the number of the friction member becomes, the more stably the pipe comes into close contact with the inner wall of the pipe upon extending of the first friction part 213.

Moreover, the first brake part 210 as described above may additionally include a first movement guide part 214, as shown FIGS. 3 and 4.

The first movement guide part 214 may allow the first friction part 213 in the first housing 111 to be moved to the first and second directions mentioned above. For example, the first movement guide part 214 may include a first horizontal long hole 214a, a first perpendicular through hole 214b, and a first guide member 214c. The first horizontal long hole 214a may be elongated in the first housing 111 to the second direction, the first perpendicular through hole 214b may be elongated in the first friction part 213 to the first direction, and one side of the first guide member 214c may be movably inserted into the first horizontal long hole 214a, and the other side may be movably inserted into the first perpendicular through hole 214b.

Therefore, as the first friction part 213 is moved toward the front direction of the first rotating member 212 along the first rotating member 212 (FIG. 3A→FIG. 3B), the first guide member 214c is moved toward the first rotating member 212 along the first horizontal long hole 214a, and at the same time, the first friction part 213 is moved toward the front direction of the first rotating member 212 along the first guide member 214c, so that the first friction part 213 is contracted, as shown in FIG. 3B. On the contrary, as the first friction part 213 is moved toward the rear end of the first rotating member 212 along the first rotating member 212 (FIG. 3B→FIG. 3A), the first guide member 214c is moved toward the inner wall of the pipe 10 along the first horizontal long hole 214a, and at the same time, the first friction part 213 is moved toward the rear end of the first rotating member 212 along first guide member 214c, so that the first friction part 213 is extended, as shown in FIG. 3A.

In addition, the first brake part 210 as described above may additionally include a roller part 215, as shown in FIGS. 1 to 4.

The first roller part 215 may be provided rotatably on the housing 111 to be easily moved on the inner wall of the pipe 10 when the first friction part 213 is separated from the inner wall of the pipe 10. Particularly when the first friction part 213 becomes contracted, the first roller part 215, instead of the first housing 111, is contacted with the inner wall of the pipe 10, thus it is additionally possible to protect the inner wall of pipe 10 from scratches or the like.

Furthermore, as shown in FIG. 1, the first roller part 215 may be provided at a location corresponding to the first friction part 213. That is, it is possible to simplify the structure by providing the first roller part 215 on the protruding portion on the first housing 111 to form the first horizontal long hole 214a of the first movement guide part 214.

Referring to FIGS. 1 to 4, the second brake part 220 will be described below. The second brake part 220 may include the same constituent elements as the first brake part 210 except for the difference in the positions the second brake part 220 is mounted.

For example, the second brake part 220 may include a second braking motor 221, a second rotating member 222 and a second friction part 223. Furthermore, the second friction part 223 may additionally include a fifth friction member 223a, a sixth friction member 223b, a seventh friction member 223c, and an eighth friction member 223d. Moreover, the second brake part 220 may additionally include a second movement guide part 224, and the second movement guide part 224 may include a second horizontal long hole 224a, a third perpendicular through hole 224b, and a second guide member 224c. In addition, the second brake part 220 may additionally include a second roller part 225.

The second braking motor 221 has the same configuration as the first braking motor 211 described above, the second rotating member 222 has the same configuration as the first rotating member 212 described above, the second friction part 223 has the same configuration as the first friction part 213 described above, the second movement guide part 224 has the same configuration as the first movement guide part 214 described above, and the second roller part 225 has the same configuration as the first roller part 215 described above. Accordingly, redundant detailed description will be omitted for the sake of brevity.

Hereinafter, referring to FIG. 1, and FIGS. 4 to 9, the linear actuator 100 described above will be explained.

Figure 5:
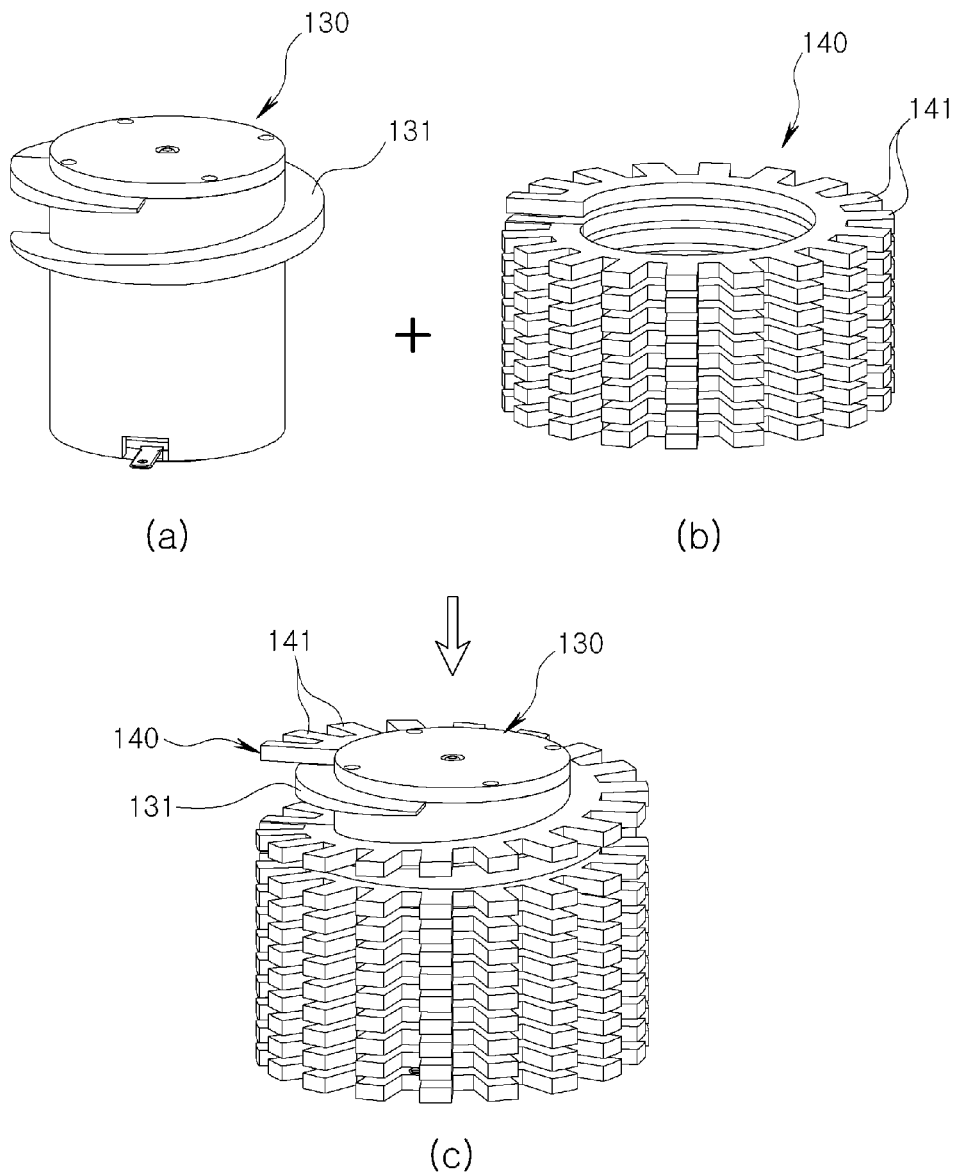
Figure 6:
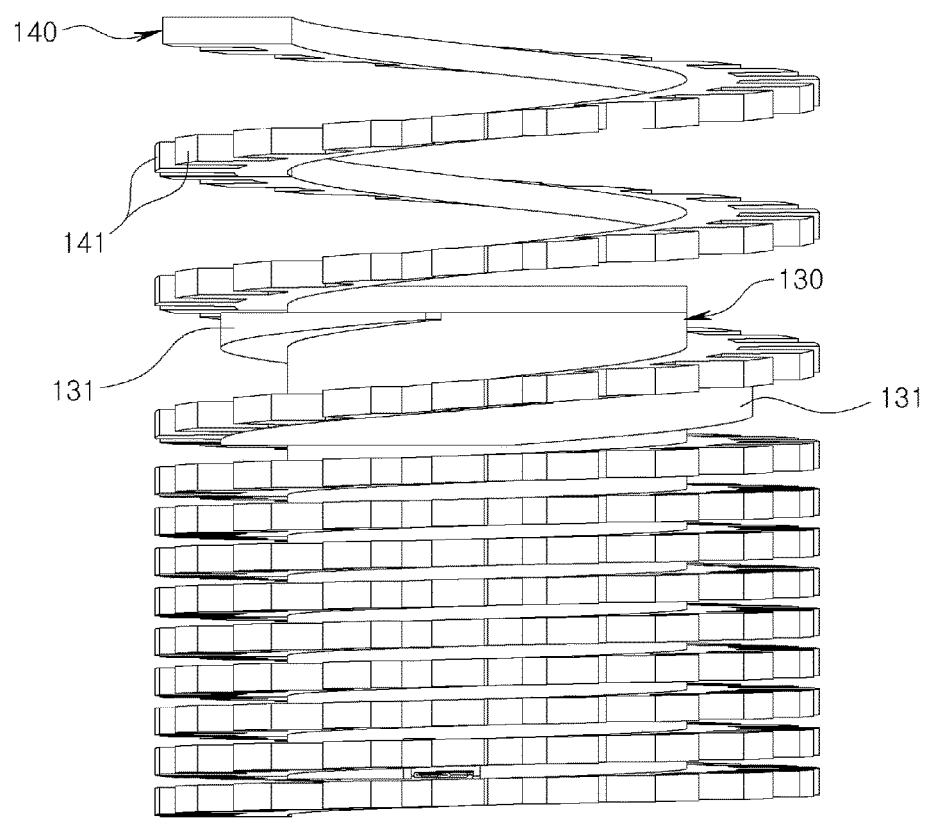
FIG. 6 illustrates the toothed spring of FIG. 5C being exited toward the front direction during rotation of the screw guide.

FIG. 5 illustrates part of a linear actuator of an in-pipe inspection robot, in which FIG. 5A illustrates a screw guide, FIG. 5B illustrates a toothed spring, and FIG. 5C illustrates the toothed spring and the screw guide engaged with each other. Further, FIG. 6 illustrates the toothed spring of FIG. 5C being exited toward the front direction during rotation of the screw guide.

Figure 7:
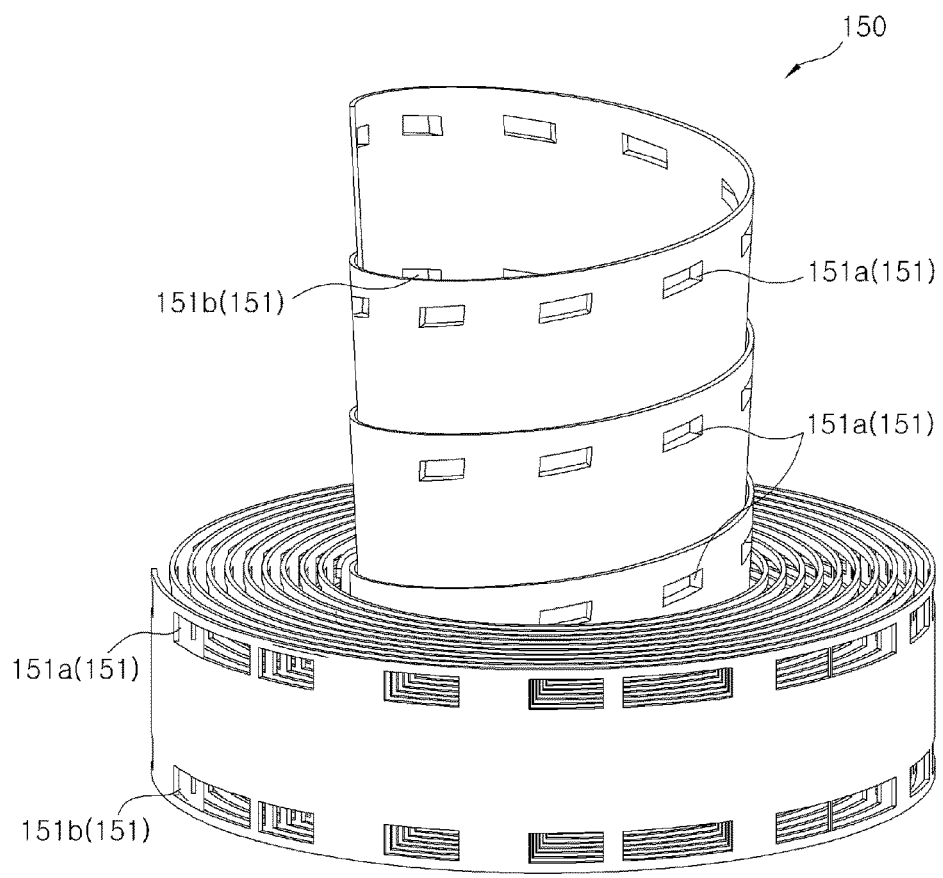
FIG. 7 is a perspective view of a plate spring of the linear actuator of the in-pipe inspection robot of FIG. 1, which is wound into a configuration of a roll.
Figure 8:
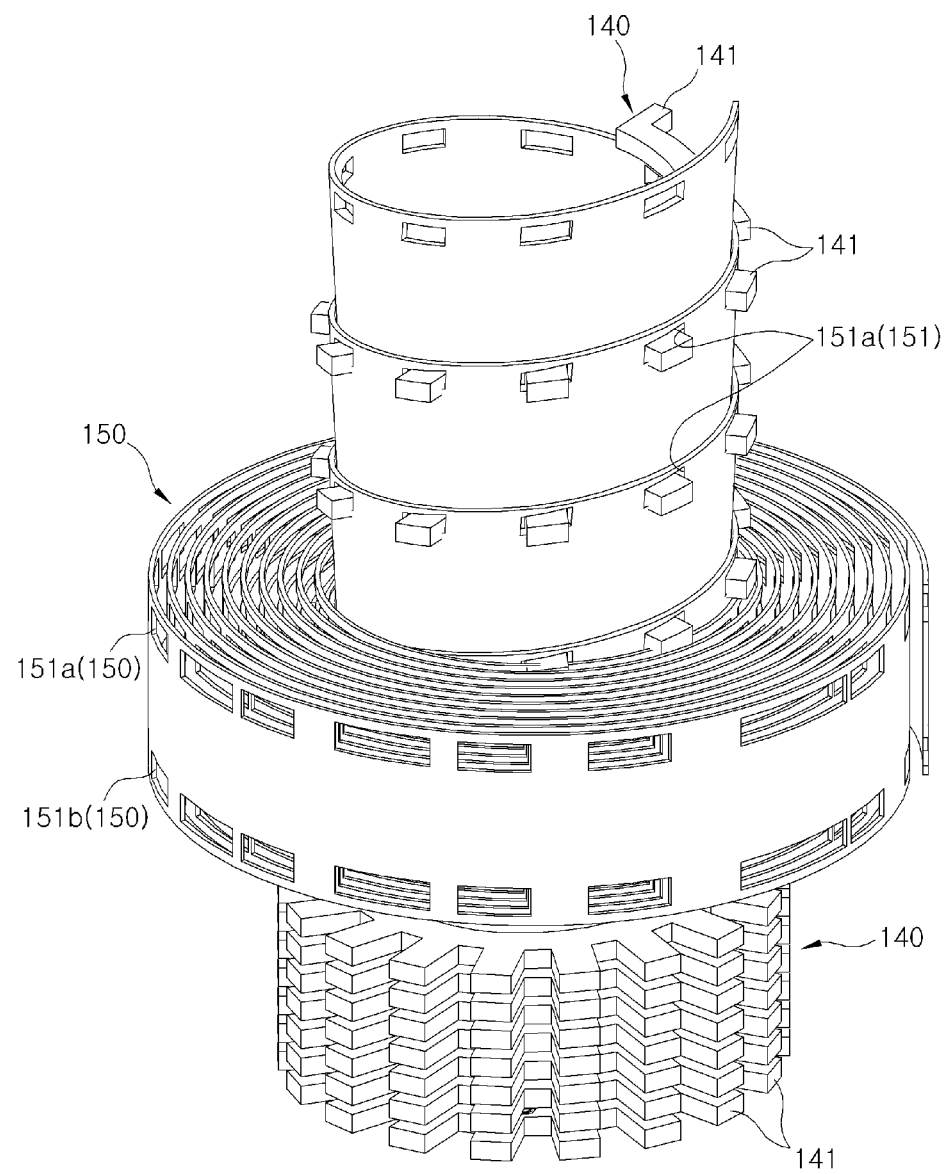
FIG. 8 is a perspective view of the toothed spring and the plate spring engaged with each other.

FIG. 7 is a perspective view of a plate spring of the linear actuator of the in-pipe inspection robot of FIG. 1, which is wound into a configuration of a roll, and FIG. 8 is a perspective view of the toothed spring and the plate spring engaged with each other.

Figure 9:
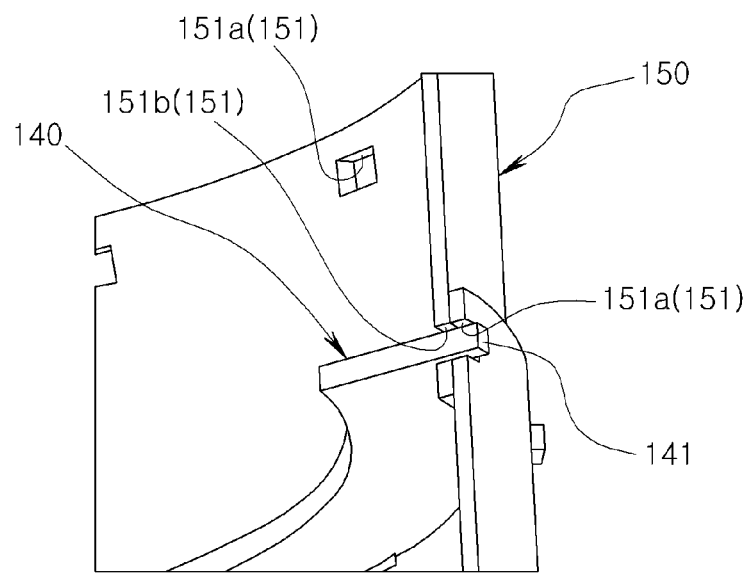
Figure 9:
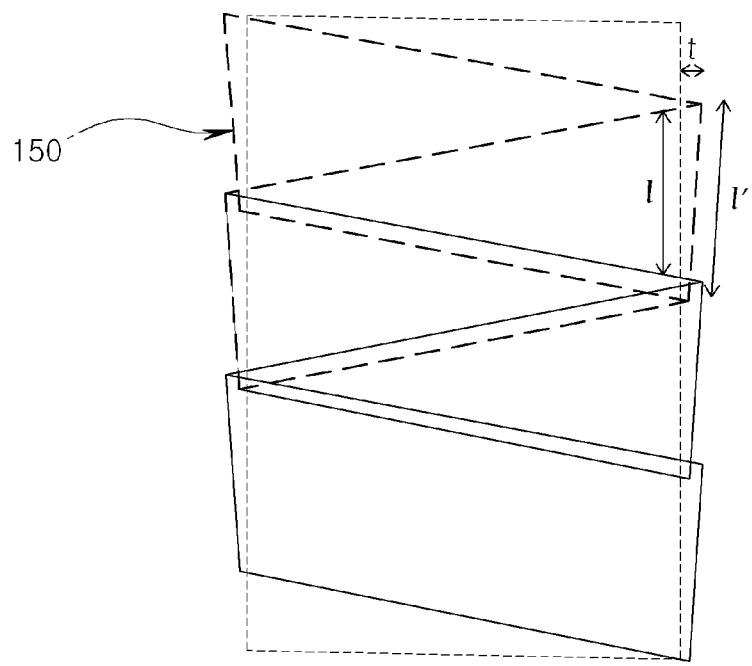

FIG. 9 illustrates a plurality of lower tooth holes and a plurality of upper tooth holes, overlapped at each pitch and meshed together with a plurality teeth, in which FIG. 9A is a perspective view with cut-away main part, and FIG. 9B is a conceptual diagram.

For example, the linear actuator 100 may include a housing part 110, a driving motor 120, a screw guide 130, a toothed spring 140 and a plate spring 150, as illustrated in FIGS. 1 to 4.

The housing part 110 may form an exterior of the linear actuator 100 and may include a first housing 111 and a second housing 112, as shown in FIGS. 1 and 4. To be specific, the housing part 110 may be divided into the first and second housings 111, 112 to allow the linear actuator 100 to be extendably and contractably driven between the first and second housings 111, 112. Moreover, as described above, in an example where the braking unit 200 includes the first brake part 210 provided on the front end of the linear actuator 100 and the second brake part 220 provided on the rear end of the linear actuator 100, the first brake part 210 may be provided on the first housing 111 and the second brake part 220 may be provided on the second housing 112.

As shown in FIG. 4, the driving motor 120 may be fixed in the housing 110, and may perform a role of rotating the screw guide 130 which will be described below.

As shown in FIG. 4, the screw guide 130 may be provided so as to be rotated by the driving motor 130, and the screw guide 130 may be configured in a cylindrical form which has a thread 131 on an upper half on an outer circumference, as shown in FIGS. 4 and 5A. In particular, the reason for forming the thread 131 on the upper half of the outer circumference of the screw guide 130, is that the front end of the toothed spring 140 (described below) has to be exited to the front direction along the thread 131 during rotation of the screw guide 130, as shown in FIGS. 5A and 6.

In addition, the screw guide 130 may have a shape of a hollow cylinder and the driving motor 120 may be located in the screw guide 130, as illustrated in FIG. 4. Therefore, the in-pipe inspection robot of the present disclosure can be advantageously used even in small-diameter pipes because total thickness or external diameter of the linear actuator 100 can be reduced, compared with a structure of using the driving motor (not shown) externally to the screw guide 130 and using separate power transfer unit (not shown) (worm gear, etc.) to connect the motor (not shown) and the screw guide 130.

As shown in FIGS. 4 and 5C, the toothed spring 140 may be wound cylindrically around the screw guide 130, with the front end being screwed to the thread of the screw guide 130, and having a plurality of teeth being provided on the outer circumference, so that the toothed spring 140 is exited to the front direction during rotation of the screw guide 130. To be specific, a plurality of teeth 141 are formed so as to be meshed with the plurality of tooth holes 151 provided in the plate spring 150, which will be described below, so that the plate spring 150 is exited together when the toothed spring 151 is exited, as shown in FIGS. 8 and 9.

During exiting operation, the length between the first and second housings 111, 112 is increased, and the linear actuator 100 is extended, as shown in FIGS. 11B and 11E. On the contrary, during entering operation, the length between the first and second housings 111, 112 is decreased, and the linear actuator 100 is contracted, as shown in FIGS. 11D and 11F.

In addition, operation of the toothed spring 140 may vary depending on the forward and reverse rotation of the driving motor 120. That is, during forward rotation of the driving motor 120 as shown in FIG. 6, the toothed spring 140 may be exited to the front direction by the screw guide 130, thus widening the pitch gap (see "l'" of FIG. 9), and during reverse rotation of the driving motor 120 as shown FIG. 6, the toothed spring 140 may be entered into the rear direction by the screw guide 130 and stacked into a cylindrical shape.

As shown in FIGS. 4, 7 to 9, the plate spring 150 may have a plurality of tooth holes 151 to be meshed with a plurality of teeth 141, so that, while the toothed spring 140 is being exited to the front direction, the plurality of teeth 141 is meshed with the plurality of teeth hoes 151, respectively, to be exited together. Particularly, as shown FIGS. 7 and 8, the plate spring 150 entered into the rear direction may be wound into a roll shape.

In addition, the operation of the plate spring 150 may vary depending on the forward and reverse rotation of the driving motor 120. That is, as shown FIGS. 8 and 9, during forward rotation of the driving motor 120, the plurality of tooth holes is meshed with the plurality of teeth 141 of the toothed spring 140 to be exited together, so that the plate spring 150 is extended in length into a cylindrical configuration, and during reverse rotation of the driving motor 120, the plate spring 150 may be stacked in a radial direction, thus decreasing length thereof, as shown FIG. 7.

Moreover, as shown in FIGS. 7 to 9, a plurality of tooth holes 151 may include a plurality of upper tooth holes 151a formed in an upper portion of the plate spring 150 and a plurality of lower tooth holes 151b formed in a lower portion of the plate spring 150. Therefore, as shown in FIG. 9, a plurality of lower tooth holes 151b and a plurality of upper tooth holes 151a may be overlapped at each pitch l' and meshed together with a plurality of teeth 141.

Hereinafter, referring to FIG. 10, an in-pipe inspection robot R will be explained according to another embodiment of the present disclosure.

Figure 10:
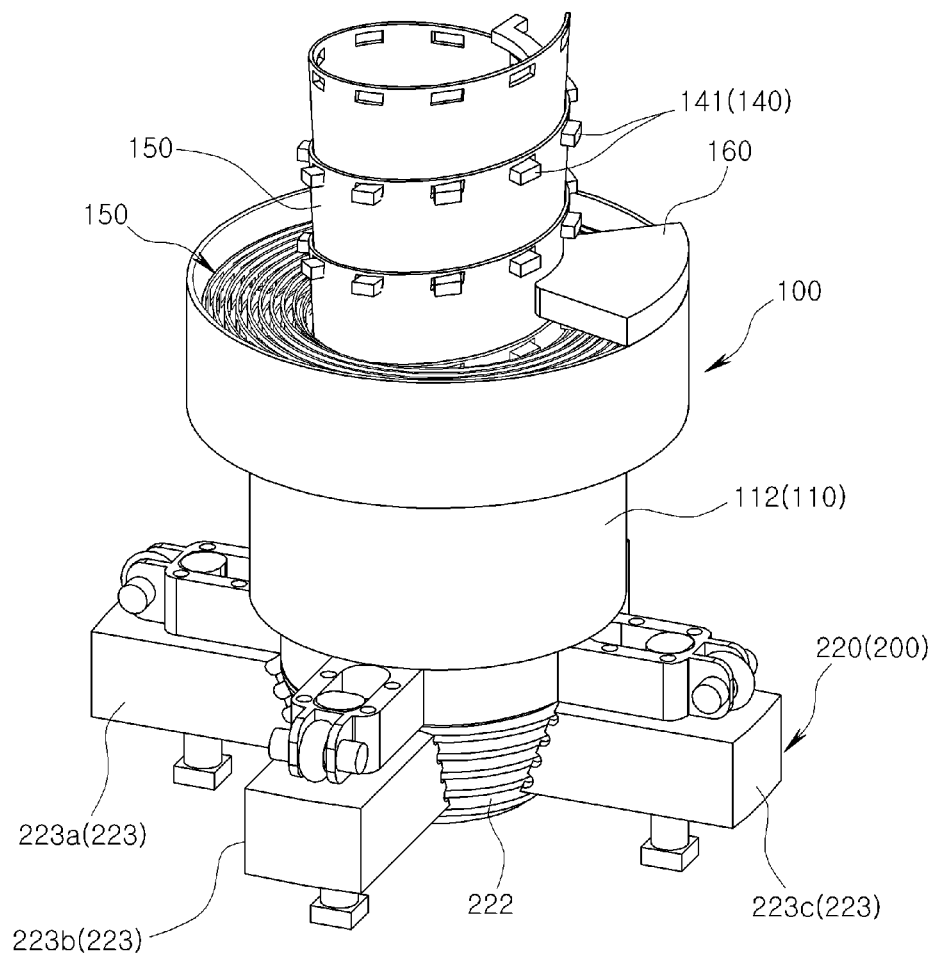
FIG. 10 is a perspective view of an in-pipe inspection robot according to another embodiment of the present disclosure.

FIG. 10 is a perspective view of an in-pipe inspection robot according to another embodiment of the present disclosure.

As shown in FIG. 10, an in-pipe inspection robot according to another embodiment of the present disclosure is similar to the embodiment of the present disclosure described above, with an exception that a guide arm 160 is added to the linear actuator 100. Accordingly, the guide arm 160 will be mainly explained below.

One side of the guide arm 160 is fixed to the housing 110 (e.g., second housing 112), and while a plurality of teeth 141 is being meshed with a plurality of tooth holes 151, the other side of the guide arm 160 serves to urge the plate spring 150 to close contact with the toothed spring 140. For example, the guide arm 160 may be a fixed body, and an inner surface of the guide arm 160 may be concaved to be closely contacted with an outer surface of the exiting plate spring 150.

Figure 11:
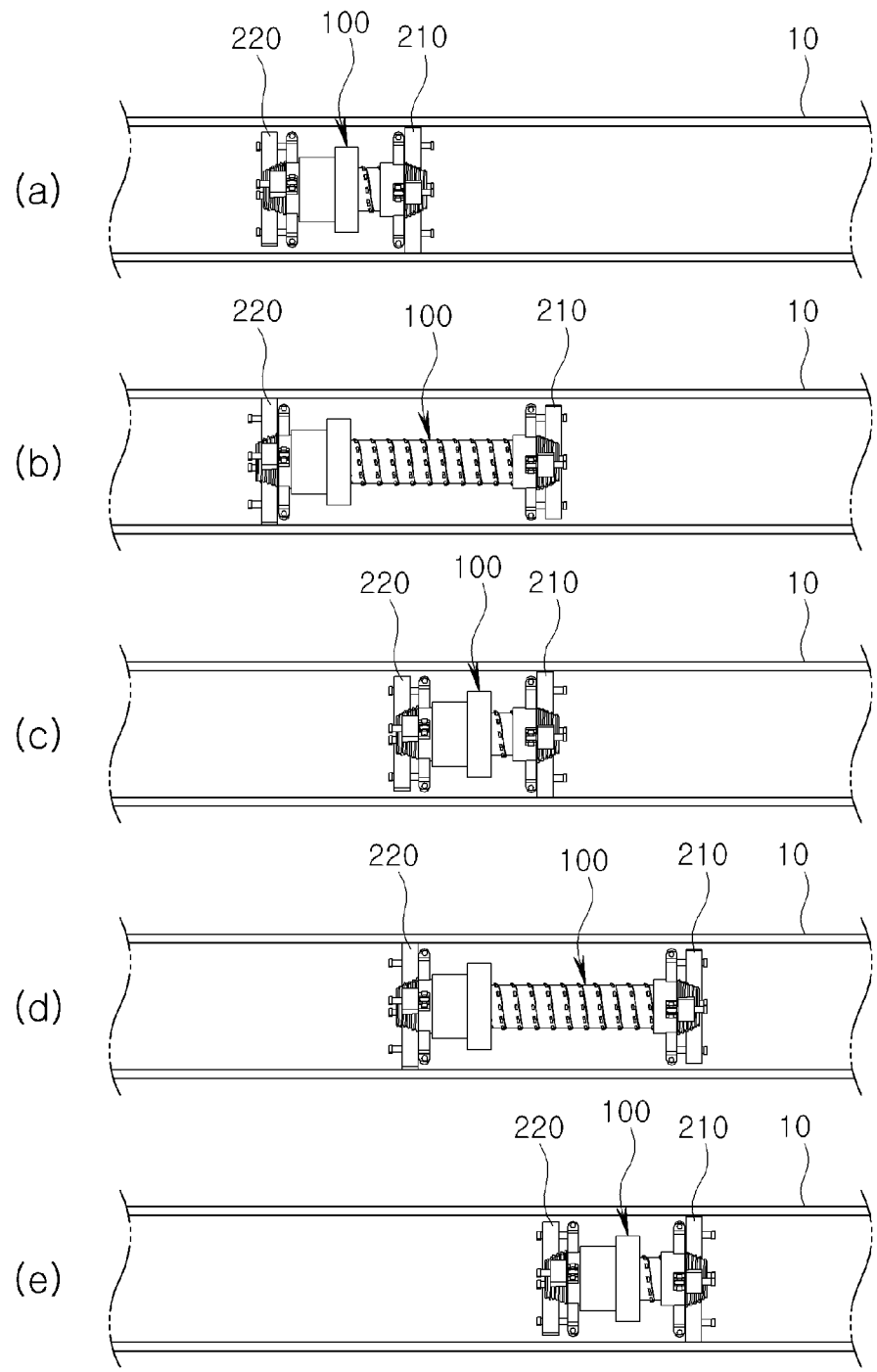
FIGS. 11A, 11B, 11C, 11D and 11E illustrate sequences of moving the in-pipe inspection robot in a pipe according to an embodiment of the present disclosure.

Hereinafter, referring to FIG. 11, operations of an in-pipe inspection robot R according to embodiments of the present disclosure will be explained.

FIGS. 11A, 11B, 11C, 11D and 11E illustrate sequences of moving the in-pipe inspection robot in a pipe according to an embodiment of the present disclosure.

Firstly, as shown in FIG. 11A, the second brake part 220 is separated from the inner wall of the pipe 10, thus releasing the rear end of the linear actuator 100 from the fixed state, and the first brake part 210 is fixed closely to the inner wall of the pipe 10, thus fixing the front end of the linear actuator 100. Then, as shown in FIG. 11B, the second barking 220 is fixed closely against the inner wall of the pipe 10, thus fixing the rear end of the linear actuator 100, and the first brake part 2120 is separated from the inner wall of the pipe 10, thus releasing the front end of the linear actuator 100 from the fixed state. After that, the linear actuator 100 is extended. During such extending, the front end of the in-pipe inspection robot R is extended toward the front direction.

When the extending of the linear actuator 100 is completed, as shown in FIG. 11C, the first brake part 210 is fixed closely against the inner wall of the pipe 10, thus fixing the front end of the linear actuator 100, and the second brake part 220 is separated from the inner wall of the pipe 10, thus releasing the rear end of the linear actuator 100 from the fixed state. After that, the linear actuator 100 is contracted. During such contracting, the rear end of the in-pipe inspection robot R is moved toward the front direction.

When the contracting of the linear actuator 100 is completed, as shown in FIG. 11D, the second brake part 220 is fixed closely against the inner wall of the pipe 10, thus fixing the rear end of the linear actuator 100, and the first brake part 210 is separated from the inner wall of the pipe, thus releasing the front end of the linear actuator 100 from the fixed state. After that, the linear actuator 100 is extended. During such extending, the front end of the in-pipe inspection robot R is extended toward the front direction.

Then, as shown in FIG. 11E, the first brake part 210 is fixed closely against the inner wall of the pipe 10, thus fixing the front end of the linear actuator 100, and the second brake part 220 is separated from the inner wall of the pipe, thus releasing the rear end of the linear actuator 100 from the fixed state. After that, the linear actuator 100 is contracted. During such contracting, the rear end of the in-pipe inspection robot R is moved toward the front direction.

The in-pipe inspection robot R is moved as the procedures described above repeat.

Meanwhile, although not illustrated, when the length of extending and contracting the linear actuator 100 is reduced, the in-pipe inspection robot R can be moved even along a curve portion of the pipe 10.

INDUSTRIAL APPLICABILITY

As described above, the in-pipe inspection robot according to embodiments of the present disclosure may have the following effects.

According to embodiments of the present disclosure, because the in-pipe inspection robot R includes a braking unit 200, the in-pipe robot R is able to exert repulsive force against the pipe 10 during driving of the linear actuator 100, and thus is able to move smoothly inside the pipe 10.

Moreover, according to embodiments of the present disclosure, because of a linear actuator 100 whose entire length is extendable and contractable, the in-pipe inspection robot R is able to move smoothly on a curved portion of the pipe 10.

Although the scope of the present invention has been described in detail with respect to preferred embodiments of the present disclosure, the scope of the present disclosure is not limited thereto, and variations and modifications by one of ordinary skill in the art using the basic concept of the invention as defined in the following claims will also belong to the scope of the present disclosure.

What is claimed is:

1. An in-pipe inspection robot which moves inside a pipe, comprising:
   a linear actuator which is extendably and contractably driven, and comprising:
      a housing part;
      a driving motor provided in the housing part;
      a screw guide in a cylindrical shape, the screw guide being rotated by the driving motor and having a thread on an upper half of an outer circumference;
      a toothed spring wound cylindrically on the screw guide, the toothed spring having a front end being screw-engaged with the thread, and a plurality of teeth on an outer circumference, so as to be exited toward a front direction when the screw guide is rotated; and
      a plate spring having a plurality of tooth holes to be meshed with the plurality of teeth, so that the plurality of teeth is meshed with the plurality of tooth holes and exited together while the toothed spring is being exited toward a front direction; and
   a braking unit configured to fix a rear end of the linear actuator to an inner wall of the pipe and release a front end of the linear actuator from a fixed state, when the linear actuator is being extended, and release the rear end of the linear actuator from the fixed state and fix the front end of the linear actuator to the inner wall of the pipe, when the linear actuator is being contracted.

2. The in-pipe inspection robot of claim 1, wherein the braking unit comprises:
   a first brake part provided on the front end of the linear actuator; and
   a second brake part provided on the rear end of the linear actuator.

3. The in-pipe inspection robot of claim 2, wherein each of the first and second brake parts comprises:
   a braking motor provided on the linear actuator and comprising a motor axis;
   a rotating member connected to the motor axis and having such a configuration that a diameter is gradually decreased in a lengthwise direction, the rotating member comprising a thread on an outer circumference; and
   a friction part screw-engaged, at one side, to the rotating member, and movably supported, at the other side, by the linear actuator, wherein during driving of the braking motor, the friction part is moved along a lengthwise direction of the rotating member to be gradually extended or contracted according to a shape of the rotating member.

4. The in-pipe inspection robot of claim 3, wherein the friction part comprises two or more friction members provided at interval with reference to a center of the rotating member.

5. The in-pipe inspection robot of claim 3, wherein the linear actuator comprises a housing, the braking motor is provided in the housing, and the motor axis is exposed outside the housing to be connected with the rotating member.

6. The in-pipe inspection robot of claim 5, wherein the friction part is provided in the housing so as to be movable in a first direction and a second direction by a movement guide part, wherein the first direction corresponds to the lengthwise direction of the rotating member and the second direction corresponds to a radial direction of the rotating member, and the movement guide part comprises:

a horizontal long hole elongated in the housing along the second direction;

a perpendicular through hole elongated in the friction part along the first direction; and a guide member movably inserted, with one side, into the horizontal long hole and inserted, with the other side, to the perpendicular through hole.

7. The in-pipe inspection robot of claim 5, wherein each of the first and second brake parts further comprises a roller part rotatably provided on the housing so as to be smoothly moved along the inner wall of the pipe, when the friction part is separated from the inner wall of the pipe.

8. The in-pipe inspection robot of claim 7, wherein the roller part is provided at a location corresponding to the friction part.

9. The in-pipe inspection robot of claim 1, wherein the housing part comprises a first housing and a second housing, and when the braking unit comprises a first brake part provided on the front end of the linear actuator and a second brake part provided on the rear end of the linear actuator, the first brake part is provided on the first housing and the second brake part is provide don the second housing.

10. The in-pipe inspection robot of claim 1, wherein the linear actuator further comprises a guide arm provided on the housing part, to bring the plate spring to a close contact with the toothed spring while the plurality of teeth is being engaged with the plurality of tooth holes.

11. The in-pipe inspection robot of claim 1, wherein the toothed spring is operated according to forward and reverse direction of the driving motor so that during forward rotation of the driving motor, the toothed spring is exited by the screw guide toward the front direction, thus widening pitch interval thereof, and during reverse rotation of the driving motor, the toothed spring is entered by the screw guide toward the rear direction and stacked into a cylindrical shape, and the plate spring is operated according to the forward and reverse rotation of the driving motor so that during forward rotation of the driving motor, the plate spring is exited together with the toothed spring which is exiting, as the plurality of tooth holes is meshed with the plurality of teeth of the toothed spring, thus being extended into a cylindrical shape with an increased length, and during reverse rotation of the driving motor, the plate spring is stacked in a radial direction thereof, thus decreasing in the length thereof.

12. The in-pipe inspection robot of claim 11, wherein the plurality of tooth holes comprise a plurality of upper tooth holes formed in an upper portion of the plate spring, and a plurality of lower tooth holes formed in a lower portion of the plate spring, and the plurality of lower tooth holes and the plurality of upper tooth holes are overlapped at each pitch and are meshed with the plurality of teeth.

13. The in-pipe inspection robot of claim 1, wherein the screw guide has a shape of a hollow cylinder, and the driving motor is located inside the screw guide.

* * * * *